United States Patent
Dedhia

(10) Patent No.: US 10,580,086 B2
(45) Date of Patent: *Mar. 3, 2020

(54) SYSTEM AND METHOD FOR CHANGING CATEGORIZATION DATA IN RELATION TO SPEND ANALYSIS REPORTS IN REAL TIME

(71) Applicant: Zycus Infotech Pvt. Ltd., Mumbai (IN)

(72) Inventor: Aatish Dedhia, Mumbai (IN)

(73) Assignee: Zycus Infotech Pvt. Ltd., Mumbai (IN)

( * ) Notice: Subject to any disclaimer, the term of this patent is extended or adjusted under 35 U.S.C. 154(b) by 129 days.

This patent is subject to a terminal disclaimer.

(21) Appl. No.: 14/672,567

(22) Filed: Mar. 30, 2015

(65) Prior Publication Data

US 2015/0206253 A1    Jul. 23, 2015

Related U.S. Application Data

(63) Continuation-in-part of application No. 13/443,862, filed on Apr. 10, 2012, now Pat. No. 9,053,457.

(30) Foreign Application Priority Data

Jan. 20, 2012    (IN) .......................... 197/MUM/2012

(51) Int. Cl.
*G06Q 10/06* (2012.01)
*G06Q 40/00* (2012.01)
*G06Q 10/08* (2012.01)
*G06Q 10/10* (2012.01)

(52) U.S. Cl.
CPC ............. *G06Q 40/12* (2013.12); *G06Q 10/06* (2013.01); *G06Q 10/087* (2013.01); *G06Q 10/10* (2013.01)

(58) Field of Classification Search
CPC ....... G06Q 10/06; G06Q 10/087; G06Q 10/10
USPC .................................................. 709/203, 223
See application file for complete search history.

(56) References Cited

U.S. PATENT DOCUMENTS

| | | | |
|---|---|---|---|
| 2008/0004922 A1* | 1/2008 | Eder ...................... | G06Q 10/04 705/7.31 |
| 2014/0032270 A1* | 1/2014 | Tung .................. | G06Q 30/0202 705/7.32 |
| 2015/0051936 A1* | 2/2015 | Chien .............. | G06Q 10/06313 705/7.23 |
| 2015/0170382 A1* | 6/2015 | Bhatia ..................... | G06T 11/20 345/440 |

* cited by examiner

*Primary Examiner* — Hitesh Patel
(74) *Attorney, Agent, or Firm* — Preston Smirman; Smirman IP Law, PLLC

(57) ABSTRACT

Systems, and methods for using same, are described for changing categorization data, in relation to spend analysis reports, in real time. The systems include a processor unit, and a computer readable medium storing instructions executable by the processor unit including a client side processing system adapted to transmit a user generated request for change, in real time, and a server side processing system adapted to receive the transmitted requested change, in real time, for effecting the requested change.

6 Claims, 1 Drawing Sheet

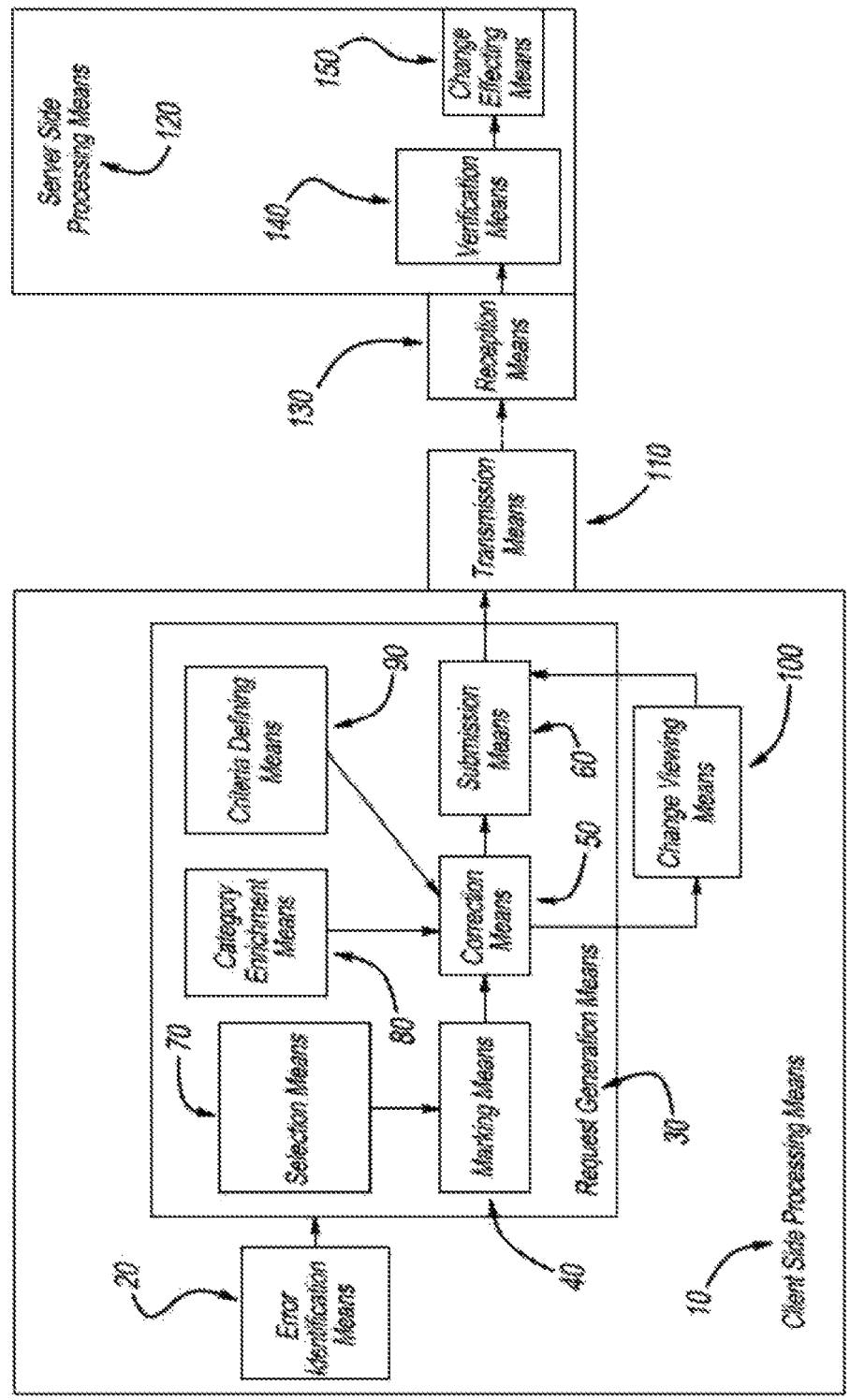

SYSTEM AND METHOD FOR CHANGING CATEGORIZATION DATA IN RELATION TO SPEND ANALYSIS REPORTS IN REAL TIME

CROSS REFERENCES TO RELATED APPLICATIONS

The present invention is a continuation-in-part of U.S. patent application Ser. No. 13/443,862, filed Apr. 10, 2012, now U.S. Pat. No. 9,053,457, issued Jun. 9, 2015, and claims priority to Indian patent application No. 197/MUM/2012, filed Jan. 20, 2012, the entire specifications of both of which are expressly incorporated herein by reference.

FIELD OF THE INVENTION

The present invention relates generally to the field of information and computation systems in relation to spend data and spend analysis. More particularly, the present invention relates to new and improved systems and methods for changing categorization data in real time.

BACKGROUND OF THE INVENTION

In enterprise resource planning ("ERP") systems, goods are typically centrally received at stores/warehouses (often referred to as "central receiving") and then distributed. Peer-to-peer ("P2P") systems offer the advantage of allowing requesters (i.e., those who request goods) to receive goods at their desk (often referred to as "desktop receiving"), thereby reducing work for the buyer/store-keeper and confirming that the user actually received the requested goods.

Quite often goods receipts are completely missed, and it is identified when invoices are being processed. Hence, proactive and reactive automated email alerts to requesters/buyers to create receipts will ensure the availability of receipts during invoice clearing, thereby saving cycle time.

In various spend analysis systems and processes, the analysis tool helps in classification of huge number of transactions into various categories of classified data. The classified data is analyzed through the tool and various reports are generated based on classified data. The various reports mention various saving opportunities based on the analysis of data and hence relate to spend analysis reports. The changes on classification feature play an important aspect in the tool, because the various reports which are generated based on classified data may not be very accurate meaning that the reports may have errors due to wrong classification of data. For example, suppose a report is generated for top five suppliers and the goods which they are offering such as particular vendor offers pen and various stationary; however, a drill machine is also shown in the report under that particular vendor. This is due to wrong classification.

Thus, there are many challenges in the market to correct the classification or the errors in the classified data through the tool by the user itself that is in real time.

Accordingly, there exists a need for a new and improved method for changing categorization data in real time that overcomes at least of the above-mentioned disadvantages.

SUMMARY OF THE INVENTION

An object of the present invention is to provide a system to change and/or correct classification information in real time. Another object of the invention is to provide a system to change classification information in real time in order to change analysis reports relating to spend analysis reports. Yet another object of the invention is to provide a system to change and/or correct classification information on the fly.

According to the present invention, there is provided a system for changing categorization data, in relation to spend analysis reports, in real time, the system comprises: a processor unit; and a computer readable medium storing instructions executable by the processor unit comprises a client side processing system adapted to transmit a user generated request for change, in real time and a server side processing system adapted to receive the transmitted requested change, in real time, for effecting the requested change.

Typically, the client side processing system comprises error identification system in a report selected from a plurality of reports relating to spend analysis reports.

Typically, the client side processing system comprises request generation system adapted to send a request to a server side processing system which is accessed by an administrator in order to make or authorize recommended changes.

Typically, the client side processing system comprises: marking system adapted to mark a field on a report relating to spend analysis which requires changes; correction system adapted to specify corrections in the marked field; and submission system adapted to submit specified correction.

Typically, the client side processing system comprises: marking system adapted to mark a field on a report relating to spend analysis which requires changes; correction system adapted to specify corrections in the marked field; and submission system adapted to submit specified correction; wherein, the marking system further comprises a selection system adapted to select a report relating to spend analysis which requires changes and/or corrections.

Typically, the client side processing system comprises: a marking system adapted to mark a field on a report relating to spend analysis which requires changes; a correction system adapted to specify corrections in the marked field; and a submission system adapted to submit specified correction; wherein, the correction system further comprises category enrichment system adapted to add replace categories to in a report relating to spend analysis.

Typically, the client side processing system comprises: a marking system adapted to mark a field on a report relating to spend analysis which requires changes; a correction system adapted to specify corrections in the marked field; and a submission system adapted to submit specified correction; wherein, the correction system further comprises search criteria defining system adapted to define search criteria in order to view/review/establish effect of correction on a report relating to spend analysis based on the defined search criteria.

Preferably, the client side processing system comprises: a marking system adapted to mark a field on a report relating to spend analysis which requires changes; a correction system adapted to specify corrections in the marked field; and a submission system adapted to submit specified correction; wherein, the correction system further comprises search criteria defining system adapted to define search criteria in order to view/review/establish effect of correction on a report relating to spend analysis based on the defined search criteria, the search criteria being populated using pre-defined dimensions.

Alternatively, the client side processing system comprises: a marking system adapted to mark a field on a report relating to spend analysis which requires changes; a correction system adapted to specify corrections in the marked field; and a submission system adapted to submit specified correction; wherein, the correction system further comprises search criteria defining system adapted to define search criteria in order to view/review/establish effect of correction on a report relating to spend analysis based on the defined search criteria, the search criteria being populated using user-defined dimensions.

Typically, the client side processing system comprises a request generation system adapted to send a request to a server side processing system which is accessed by an administrator in order to make or authorize recommended changes; the request generation system comprises a comment addition system adapted to add a comment in relation to corrections requested.

Typically, the client side processing system comprises a change viewing system in order to view changes in a report relating to spend analysis due to change in category.

Typically, the client side processing system comprises a transmission system adapted to transmit submitted corrections in relation to a specified field to a server side for authentication and/or verification.

Typically, the server side processing system comprises a reception system adapted to receive generated request by a user for verification.

Typically, the server side processing system comprises a change effecting system for effecting changes to a report relating to spend analysis upon verification.

Typically, the server side processing system comprises a resolving system adapted to resolve conflicting changes in each of the reports relating to spend analysis reports.

Typically, the server side processing system comprises an authorizing system adapted to authorized changes in each of the reports relating to spend analysis reports.

According to the present invention, there is provided a method for changing categorization data in real time, the method comprises the steps of: transmitting a user generated request for change, in real time from a client side processing system and receiving transmitted requested change, in real time, for effecting the requested change by the server side processing system.

Typically, the method comprises the step of identifying an error identification system in a report selected from a plurality of reports relating to spend analysis.

Typically, the method comprises the step of sending a request to a server side which is accessed by an administrator in order to make or authorize recommended changes.

Typically, the method comprises the steps of: marking a field on a report relating to spend analysis that requires changes; specifying corrections in the marked field; and submitting the specified correction.

Typically, the method comprises the steps of: marking a field on a report relating to spend analysis that requires changes; specifying corrections in the marked field; and submitting the specified correction, wherein the step of marking further comprises the step of selecting a category in a report relating to spend analysis that requires changes and/or corrections.

Typically, the method comprises the steps of: marking a field on a report relating to spend analysis which requires changes; specifying corrections in the marked field; and submitting the specified correction, wherein the step of specifying corrections further comprises the step of adding categories to a report relating to spend analysis.

Typically, the method comprises the steps of: marking a field on a report relating to spend analysis that requires changes; specifying corrections in the marked field; and submitting the specified correction, wherein the step of specifying corrections further comprises the step of defining search criteria in order to view/review/establish effect of correction on a report relating to spend analysis based on the defined search criteria.

Preferably, the method comprises the steps of: marking a field on a report relating to spend analysis that requires changes; specifying corrections in the marked field; and submitting the specified correction, wherein the step of specifying corrections further comprises the step of defining search criteria in order to view/review/establish effect of correction on a report relating to spend analysis based on the defined search criteria, the search criteria being populated using pre-defined dimensions.

Alternatively, the method comprises the steps of: marking a field on a report relating to spend analysis that requires changes; specifying corrections in the marked field; and submitting the specified correction, wherein the step of specifying corrections further comprises the step of defining search criteria in order to view/review/establish effect of correction on a report relating to spend analysis based on the defined search criteria, the search criteria being populated using user-defined dimensions.

Typically, the method comprises the step of sending a request to a server side that is accessed by an administrator in order to make or authorize recommended changes, and further comprises a step of adding a comment in relation to corrections requested.

Typically, the method comprises the step of viewing changes in a report relating to spend analysis due to change in category.

Typically, the method comprises the step of transmitting submitted corrections in relation to a specified field to a server side for authentication and/or verification.

Typically, the method comprises the step of receiving generated request by a user for verification.

Typically, the method comprises the step of effecting changes to a report relating to spend analysis upon verification.

Typically, the method comprises the step of resolving conflicting changes in each of the reports relating to spend analysis reports.

Typically, the method comprises the step of authorizing changes in each of the reports relating to spend analysis reports.

In accordance with one embodiment of the present invention, a system is provided for changing categorization data, in relation to spend analysis reports, in real time, the system comprising:

a processor unit; and a computer readable medium storing instructions executable by the processor unit comprising a client side processing system adapted to transmit a user generated request for change, in real time, and a server side processing system adapted to receive the transmitted requested change, in real time, for effecting the requested change;

wherein the client side processing system includes an error identification system in a report selected from a plurality of reports relating to spend analysis reports;

wherein the client side processing system includes a request generation system adapted to send a request to a server side processing system which is accessed by an administrator in order to make or authorize recommended changes;

wherein the client side processing system includes a marking system adapted to mark a field on a report relating to spend analysis that requires changes, wherein the marking system includes a strategic marking system, wherein the strategic marking system employs a preconfigured strategic decision rule to mark the field on the report relating to spend analysis that requires changes;

wherein the server side processing system includes reception system adapted to receive a generated request by the user for verification;

wherein the server side processing system includes change effecting system for effecting changes to a report relating to spend analysis upon verification;

wherein the server side processing system includes authorizing system adapted to authorize changes in each report relating to spend analysis reports; and wherein the server side processing system includes resolving system adapted to resolve conflicting changes in each report relating to spend analysis reports.

In accordance with another embodiment of the present invention, a method is provided for changing categorization data, in real time, comprising the steps of:

transmitting a user generated request for change, in real time, from a client side processing system;

marking a field on a report relating to spend analysis that requires changes, from the client side processing system, wherein the step of marking employs a preconfigured strategic decision rule to mark the field on the report relating to spend analysis that requires changes;

receiving a transmitted requested change, in real time, for effecting the requested change by the server side processing system;

wherein the server side processing system includes reception system adapted to receive a generated request by the user for verification;

wherein the server side processing system includes change effecting system for effecting changes to a report relating to spend analysis upon verification;

wherein the server side processing system includes authorizing system adapted to authorize changes in each report relating to spend analysis reports;

identifying an error in the report selected from a plurality of reports relating to spend analysis;

sending a request to a server side that is accessed by an administrator in order to make or authorize recommended changes; and resolving conflicting changes in each report relating to spend analysis reports.

These and other various objects, features, advantages, and benefits of the present invention can be more fully appreciated with reference to the detailed description and accompanying drawings that follow.

BRIEF DESCRIPTION OF THE DRAWINGS

Other advantages of the present invention will be readily appreciated as the same becomes better understood by reference to the following detailed description when considered in connection with the accompanying drawings wherein:

The FIGURE illustrates an exemplary schematic of the system, in accordance with the general teachings of the present invention.

DETAILED DESCRIPTION OF THE INVENTION

The specific embodiments of the present invention are described below in greater detail. The following description of the specific embodiments refers at various places to the accompanying drawings and specific environments, applications, platforms, examples, computer screenshots, and implementations. Such description is provided for thorough understanding of the present invention and is illustrative rather than limiting.

According to the general teachings of the present invention, there is provided a system, and method for using same, for changing categorization data, in relation to spend analysis reports, in real time. Referring to the FIGURE, there is shown an exemplary schematic of the system, in accordance with the general teachings of the present invention.

The system and method of the present invention aims to allow a user to analyze the most accurate and high quality data by correcting discrepancies in reports relating to spend analysis.

In accordance with an embodiment of the present invention, there is provided a client side processing system 10.

In accordance with another embodiment of the present invention, the client side processing system comprises an error identification system 20 in a report selected from a plurality of reports relating to spend analysis.

In accordance with yet another embodiment of the present invention, the client side processing system comprises a request generation system 30 adapted to send a request to a server side processing system that may be accessed by an administrator in order to make or authorize recommended changes.

In accordance with still another embodiment of the present invention, the request generation system comprises: a marking system 40 adapted to mark a field on a report that requires changes; a correction system 50 adapted to specify corrections in the marked field; and a submission system 60 adapted to submit specified correction.

The marking system may further include a selection system 70 adapted to select a report, relating to spend analysis, that requires changes and/or corrections. This may be a report that has incorrect categories of classification.

The correction system may further include a category enrichment system 80 adapted to add categories to a report relating to spend analysis.

The correction system may further include a search criteria defining system 90 adapted to define search criteria in order to view/review/establish the effect of a correction on a report based on the defined search criteria. The search criteria may be populated using pre-defined dimensions or user-defined dimensions.

The marking system may also include a system generated strategic marking system and/or intelligent marking system, wherein the system strategically and/or intelligently analyzes the reports based on preconfigured strategic decision rules to identify and/or mark areas in the report for the users' acceptance for making corrections in the reports for changing categories of the marked fields. Preconfigured decision rules may be fed to the system to analyze reports/fields present in the reports of various categories For example, for the category of computers, the system may be fed with heuristics/words such as, but not limited to: devices; mobile; handsets; and/or the like, as error fields to be searched and identified by the system in the reports under the category of computers and mark them for change in categorization for acceptance by the users.

In the category of computers, there could be various line items present in the report, such as, but not limited to: laptops, printers, hard disk, ADOBE READER™ software (e.g., shift/create to category software), MICROSOFT™ professional software (e.g., shift/create to category software), motherboard, mobile devices (e.g., change to category communication devices), handsets (e.g., change to category communication devices), HP™ notepads, HP™ tablets and/or the like.

Thus in the above report, based on strategic preconfigured heuristics and wordings, the system may by itself identify and mark those items, fields for correction of categorization on the fly by the users.

If a separate category is present for software applications, the system may mark the item field for shifting, thus the user may be fed with strategic information that if the users shifts such items to a different category, then it will give the user better visibility to the total spend in that particular category. If an already separate category does not exist in the system, the fields may still be marked to provide visibility to the user for shifting it to a separate category at a later stage.

Similarly, for various categories, the system may be fed with preconfigured decision rules to strategically identify cells/fields required for shuffling/shifting to different categories to provide better visibility of the reports present in that category. This will resolve the users' cumbersome role of scanning each and every category and reports to manually identify the errors and taking it forward for changing the classification on the fly through the system. This system provides an intelligent method of marking the fields as errors for change that may provide added value for the users.

In accordance with another embodiment of the present invention, the request generation system 30 may comprise a comment addition system adapted to add a comment in relation to the corrections requested. These may be reasons for the change(s).

In accordance with yet another embodiment of the present invention, there is provided a change viewing system 100 in order to view the changes in a report relating to spend analysis due to a change in category. This enables a user to make a decision whether the change is correct or not.

In accordance with another embodiment of the present invention, there is provided a transmission system 110 adapted to transmit submitted corrections in relation to a specified field to a server side for authentication and/or verification.

In accordance with an embodiment of the present invention, there is provided a server side processing system 120 adapted to receive, through a reception system 130, generated request(s) by a user for verification.

In accordance with an embodiment of the present invention, the server side processing system 120 may comprise a verification system 140 adapted to verify changes to a report relating to spend analysis.

In accordance with an embodiment of the present invention, the server side processing system 120 may comprise a change effecting system 150 for effecting changes to a report relating to spend analysis upon verification.

By way of a non-limiting example, the approval flow for approving conflicting changes may flow to the respective approver based on the value of transaction to be rectified, the volume of transactions, the business unit of transaction, the category, and/or combinations thereof. For example, decisions affecting less than a value of $1 million may go to approver X, and decisions affecting more than a value of $1 million may go to approver Y.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device or system. Examples of a computing device or system may include, but are not limited to, an electronic book reading device, a computer workstation, a terminal computer, a server computer, a handheld device (e.g., a tablet computer, a personal digital assistant "PDA", a mobile telephone, a Smartphone, and/or the like), a web appliance, a network router, a network switch, a network bridge, any machine capable of executing a sequence of instructions that specify an action to be taken by that machine, and any combinations thereof. In one example, a computing device may include and/or be included in, a kiosk.

The computer device or system may also include an input device. In one example, a user of the computer device or system may enter commands and/or other information into computer device or system via an input device. Examples of an input device may include, but are not limited to, an alpha-numeric input device (e.g., a keyboard), a pointing device, a joystick, a gamepad, an audio input device (e.g., a microphone, a voice response system, and/or the like), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device or system via a storage device (e.g., a removable disk drive, a flash drive, and/or the like) and/or a network interface device. A network interface device, such as network interface device may be utilized for connecting the computer device or system to one or more of a variety of networks and/or one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, and/or the like) may be communicated to and/or from the computer device or system via a network interface device.

The computer device or system may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device or system may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for changing categorization data, in relation to spend analysis reports, comprising:
   a mobile telecommunication device;
   a computer system;
   a communication interface for wirelessly accessing the computer system from the mobile telecommunication device;
   a processor unit operably associated with the computer system; and
   a computer readable medium storing instructions executable by the processor unit comprising a client side processing system adapted to transmit a user generated request for change, in real time, and a server side processing system adapted to receive the transmitted requested change, in real time, for effecting the requested change;
   wherein the client side processing system includes an error identification system in a report selected from a plurality of reports relating to spend analysis reports;
   wherein the client side processing system includes a request generation system adapted to send a request to a server side processing system which is accessed by an administrator in order to make or authorize recommended changes;
   wherein the client side processing system includes a marking system adapted to mark a field on a report relating to spend analysis that requires changes, wherein the marking system includes a strategic marking system, wherein the strategic marking system employs a preconfigured strategic heuristics-based decision rule to automatically identify and mark the field on the report relating to spend analysis that requires changes;
   wherein the client side processing system includes a correction system adapted to specify corrections in the marked field;
   wherein the client side processing system includes a submission system adapted to submit specified corrections;
   wherein the server side processing system includes a reception system adapted to receive a generated request by the user for verification;
   wherein the server side processing system includes a change effecting system for effecting changes to a report relating to spend analysis upon verification;
   wherein the server side processing system includes an authorizing system adapted to authorize changes in each report relating to spend analysis reports;
   wherein the server side processing system includes a resolving system adapted to resolve conflicting changes in each report relating to spend analysis reports;
   wherein the client side processing system includes a request generation system adapted to send a request to a server side processing system which is accessed by an administrator in order to make or authorize recommended changes, the request generation system comprising comment addition system adapted to add a comment in relation to corrections requested;
   wherein the client side processing system further comprises a transmission system adapted to transmit submitted corrections in relation to a specified field to a server side for authentication or verification; and
   wherein the client side processing system further comprises a change viewing system in order to view changes in a report relating to spend analysis due to a change in category.

2. The system as claimed in claim 1, wherein the marking system further comprises a selection system adapted to select a report relating to spend analysis that requires changes or corrections.

3. The system as claimed in claim 1, wherein the correction system further comprises a category enrichment system adapted to replace categories in a report relating to spend analysis.

4. The system as claimed in claim 1, wherein the correction system further comprises a search criteria defining system adapted to define search criteria in order to view, review or establish an effect of a correction on a report relating to spend analysis based on the defined search criteria.

5. The system as claimed in claim 1, wherein the correction system further comprises a search criteria defining system adapted to define search criteria in order to view, review or establish an effect of a correction on a report relating to spend analysis based on the defined search criteria, the search criteria being populated using pre-defined dimensions.

6. The system as claimed in claim 1, wherein the correction system further comprises a search criteria defining system adapted to define search criteria in order to view, review or establish an effect of a correction on a report relating to spend analysis based on the defined search criteria, the search criteria being populated using user-defined dimensions.

* * * * *